US011603788B2

(12) United States Patent
Ghorpade et al.

(10) Patent No.: US 11,603,788 B2
(45) Date of Patent: Mar. 14, 2023

(54) MIXING CONDUITS INCLUDING SWIRLER VANES FOR USE WITHIN AN EXHAUST TREATMENT SYSTEM

(71) Applicant: CNH Industrial America LLC, New Holland, PA (US)

(72) Inventors: Kaushal Ghorpade, Chicago, IL (US); Hesam Abbassi, Birmingham, MI (US); Panos Tamamidis, Northbrook, IL (US); Samrendra K. Singh, Bolingbrook, IL (US)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 17/343,053

(22) Filed: Jun. 9, 2021

(65) Prior Publication Data

US 2021/0388750 A1 Dec. 16, 2021

Related U.S. Application Data

(60) Provisional application No. 63/039,512, filed on Jun. 16, 2020.

(51) Int. Cl.
*F01N 3/28* (2006.01)
*B01D 53/94* (2006.01)
(Continued)

(52) U.S. Cl.
CPC ......... *F01N 3/2892* (2013.01); *B01D 53/944* (2013.01); *B01F 23/2132* (2022.01);
(Continued)

(58) Field of Classification Search
CPC ...... F01N 3/2892; F01N 3/103; F01N 3/2066; F01N 2610/146; B01D 53/944;
(Continued)

(56) References Cited

U.S. PATENT DOCUMENTS 1,496,345 A * 6/1924 Lichtenthaeler .... B01F 25/3131
366/147
7,877,983 B2 * 2/2011 Kunkel ..................... F01N 1/12
60/286
(Continued)

FOREIGN PATENT DOCUMENTS

CN 108412593 A 8/2018
CN 106194347 B 12/2018
(Continued)

OTHER PUBLICATIONS

Rudder et al., "Close Coupled DOC-Mixer-SCR for Tier 4 Final", dated 2013 (10 pages) http://donaldsonoemfiltration.com/library/files/documents/pdfs/082833.pdf.
(Continued)

*Primary Examiner* — Devon C Kramer
*Assistant Examiner* — Kelsey L Stanek
(74) *Attorney, Agent, or Firm* — Rickard DeMille; Rebecca Henkel

(57) ABSTRACT

A mixing conduit for use within an exhaust treatment system of a work vehicle. The mixing conduit is configured to receive engine exhaust and a mixture of engine exhaust and reductant. The mixing conduit includes an outer tube and an inner tube within the outer tube. Each tube extends lengthwise from upstream ends to downstream ends of the inner and outer tubes, respectively. The inner tube includes an exterior surface, and the outer tube includes an interior surface. The inner tube defines an inner flowpath within the inner tube. The outer tube and inner tube also define an outer (Continued)

flowpath radially between the exterior surface of the inner tube and the interior surface of the outer tube. The mixing conduit further includes one or more swirler vanes extending radially between the exterior surface of the inner tube and the interior surface of the outer tube and within the outer flowpath.

15 Claims, 4 Drawing Sheets

(51) Int. Cl.
| | | |
|---|---|---|
| *F01N 3/10* | (2006.01) | |
| *F01N 3/20* | (2006.01) | |
| *B01F 23/213* | (2022.01) | |
| *B01F 25/313* | (2022.01) | |
| *B01F 25/4314* | (2022.01) | |
| *B01F 35/91* | (2022.01) | |
| *B01F 25/00* | (2022.01) | |
| *B01F 35/90* | (2022.01) | |

(52) U.S. Cl.
CPC ...... *B01F 25/3131* (2022.01); *B01F 25/4314* (2022.01); *B01F 35/91* (2022.01); *F01N 3/103* (2013.01); *F01N 3/2066* (2013.01); *B01F 2025/913* (2022.01); *B01F 2025/916* (2022.01); *B01F 2035/99* (2022.01); *F01N 2610/146* (2013.01)

(58) Field of Classification Search
CPC .. B01F 3/04049; B01F 5/0451; B01F 5/0614; B01F 15/063; B01F 2005/0017; B01F 2005/0025; B01F 2015/062
USPC .......................................................... 60/299
See application file for complete search history.

(56) References Cited

U.S. PATENT DOCUMENTS

| | | |
|---|---|---|
| 8,490,606 B2 | 7/2013 | Zeitoun |
| 9,371,942 B2 | 6/2016 | Jensen et al. |
| 9,494,063 B2 | 11/2016 | Düpmeier et al. |
| 10,196,957 B2 | 2/2019 | Petry |
| 2013/0340417 A1* | 12/2013 | Morey ............... B01F 3/04049 60/317 |
| 2014/0196441 A1 | 7/2014 | Katou et al. |
| 2015/0040537 A1* | 2/2015 | Hicks ................. B01F 3/04049 60/273 |
| 2015/0044103 A1* | 2/2015 | Sampath ............... B01F 5/0616 422/168 |
| 2015/0071826 A1* | 3/2015 | Sampath ............... B01F 5/0688 422/168 |
| 2017/0114693 A1* | 4/2017 | Stelzer ................. B01F 5/0062 |
| 2018/0313246 A1* | 11/2018 | Zhang .................. B01F 5/0659 |
| 2020/0378291 A1* | 12/2020 | Abbassi ............... B01F 5/0473 |

FOREIGN PATENT DOCUMENTS

| | | |
|---|---|---|
| CN | 110332035 B | 1/2020 |
| EP | 3462002 A1 | 4/2019 |
| WO | WO 2013004917 | 1/2013 |
| WO | WO 2016062395 | 4/2016 |
| WO | WO 2017201558 | 11/2017 |
| WO | WO 2018019469 | 2/2018 |
| WO | WO 2018177778 | 10/2018 |

OTHER PUBLICATIONS

Continental, "Ring-Shape DOC for Advanced Compact SCR", dated 2019 (2 pages) https://www.continental-automotive.com/en-gl/Trucks-Buses/Powertrain/Diesel-Vehicles/Exhaust-Mangement-Aftertreatment/Exhaust-Systems/Ring-Shape-DOC-for-Advanced-Compact-SCR.
European Search Report issued in corresponding EP Application No. 201179684.2, dated Nov. 18, 2021 (7 pages).

* cited by examiner

MIXING CONDUITS INCLUDING SWIRLER VANES FOR USE WITHIN AN EXHAUST TREATMENT SYSTEM

CROSS-REFERENCE TO RELATED APPLICATIONS

The present application is based upon and claims the right of priority to U.S. Provisional Patent Application No. 63/039,512, filed Jun. 16, 2020, the disclosure of which is hereby incorporated by reference herein in its entirety for all purposes.

FIELD

The present subject matter relates generally to the treatment of engine exhaust gases generated by work vehicles and, more particularly, to a mixing conduit for use within exhaust treatment systems that reduces condensation within the mixing conduit.

BACKGROUND

Typically, work vehicles, such as tractors and other agricultural vehicles, include an exhaust treatment system for controlling engine emissions. As is generally understood, exhaust treatment systems for work vehicles often include a diesel oxidation catalyst (DOC) system in fluid communication with a selective catalytic reduction (SCR) system. The DOC system is generally configured to oxidize carbon monoxide and unburnt hydrocarbons contained within the engine exhaust and may include a mixing chamber for mixing an exhaust reductant, such as a diesel exhaust fluid (DEF) or any other suitable urea-based fluid, into the engine exhaust. For instance, the exhaust reductant is often pumped from a reductant tank mounted on and/or within the vehicle and injected onto the mixing chamber to mix the reductant with the engine exhaust. The resulting mixture may then be supplied to the SCR system via a mixing conduit that promotes further mixing of the reductant and the engine exhaust. Within the SCR system, the reductant is generally reacted with a catalyst in order to reduce the amount of nitrous oxide (NOx) emissions contained within the engine exhaust.

One of the challenges inherent with known exhaust treatment systems lies in obtaining an efficient mixture of exhaust reductant with the diesel exhaust stream. Under known approaches, the liquid exhaust reductant is sprayed into the exhaust stream for mixing therewith. The mixture of the engine exhaust and reductant supplied to the mixing conduit is generally at an elevated temperature relative to the temperature of the mixing conduit. After a short distance, a portion of the liquid exhaust reductant typically condenses onto the walls of the mixing pipe due to the temperature differential. The condensed liquid will then gather into a liquid stream flowing along the wall of the pipe. Once the liquid stream is formed, a significant portion of the exhaust reductant is not available for mixture with the exhaust stream prior to entry into the SCR system. This leads to inefficiencies in the exhaust treatment system, as it is desirable for the exhaust reductant to be uniformly mixed with the exhaust gas to achieve the desired ratio of pollutants to reactants. A system with poorly distributed exhaust reductant is substantially inefficient, requiring excessive exhaust reductant consumption in order to meet emissions targets. Additionally, the liquid stream of reductant will typically dry and cause caking within the exhaust treatment system and is generally further associated with increased ammonia slip within the system.

Accordingly, a mixing conduit for an exhaust treatment system that reduces the amount of reductant condensation within the mixing conduit would be welcomed in the technology.

BRIEF DESCRIPTION

Aspects and advantages of the invention will be set forth in part in the following description, or may be obvious from the description, or may be learned through practice of the invention.

In one aspect, the present subject matter is directed to a mixing conduit for use within an exhaust treatment system of a work vehicle. The mixing conduit is configured to receive engine exhaust and a mixture of engine exhaust and reductant from a diesel oxidation catalyst (DOC) of the exhaust treatment system. The mixing conduit includes an outer tube extending lengthwise from a first upstream end of the outer tube to a first downstream end of the outer tube. The outer tube further includes an interior surface. The mixing conduit additionally includes an inner tube extending lengthwise within the outer tube from a second upstream end of the inner tube to a second downstream end of the inner tube. The inner tube includes an exterior surface. Further, the inner tube defines an inner flowpath within the inner tube. The outer tube and inner tube also define an outer flowpath radially between the exterior surface of the inner tube and the interior surface of the outer tube. The mixing conduit further includes one or more swirler vanes extending radially between the exterior surface of the inner tube and the interior surface of the outer tube and within the outer flowpath.

In another aspect, the present subject matter is directed to an exhaust treatment system for a work vehicle. The system includes an exhaust conduit configured for transmitting engine exhaust from an engine. The system further includes a DOC system in flow communication with the exhaust conduit for receiving the engine exhaust. The DOC system includes a reductant injector configured to introduce a reductant into a portion of the engine exhaust to form a mixture of engine exhaust and reductant. The system additionally includes a mixing conduit in flow communication with the DOC system for receiving the engine exhaust and the mixture of engine exhaust and reductant from DOC system. The mixing conduit includes an outer tube extending lengthwise from a first upstream end of the outer tube to a first downstream end of the outer tube. The outer tube further includes an interior surface. The mixing conduit additionally includes an inner tube extending lengthwise within the outer tube from a second upstream end of the inner tube to a second downstream end of the inner tube. The inner tube includes an exterior surface. Further, the inner tube defines an inner flowpath within the inner tube. The outer tube and inner tube also define an outer flowpath radially between the exterior surface of the inner tube and the interior surface of the outer tube. The mixing conduit further includes one or more swirler vanes extending radially between the exterior surface of the inner tube and the interior surface of the outer tube and within the outer flowpath.

These and other features, aspects and advantages of the present technology will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present technology, including the best mode thereof, directed to one of ordinary skill in the art, is set forth in the specification, which makes reference to the appended figures, in which.

Figure 1:
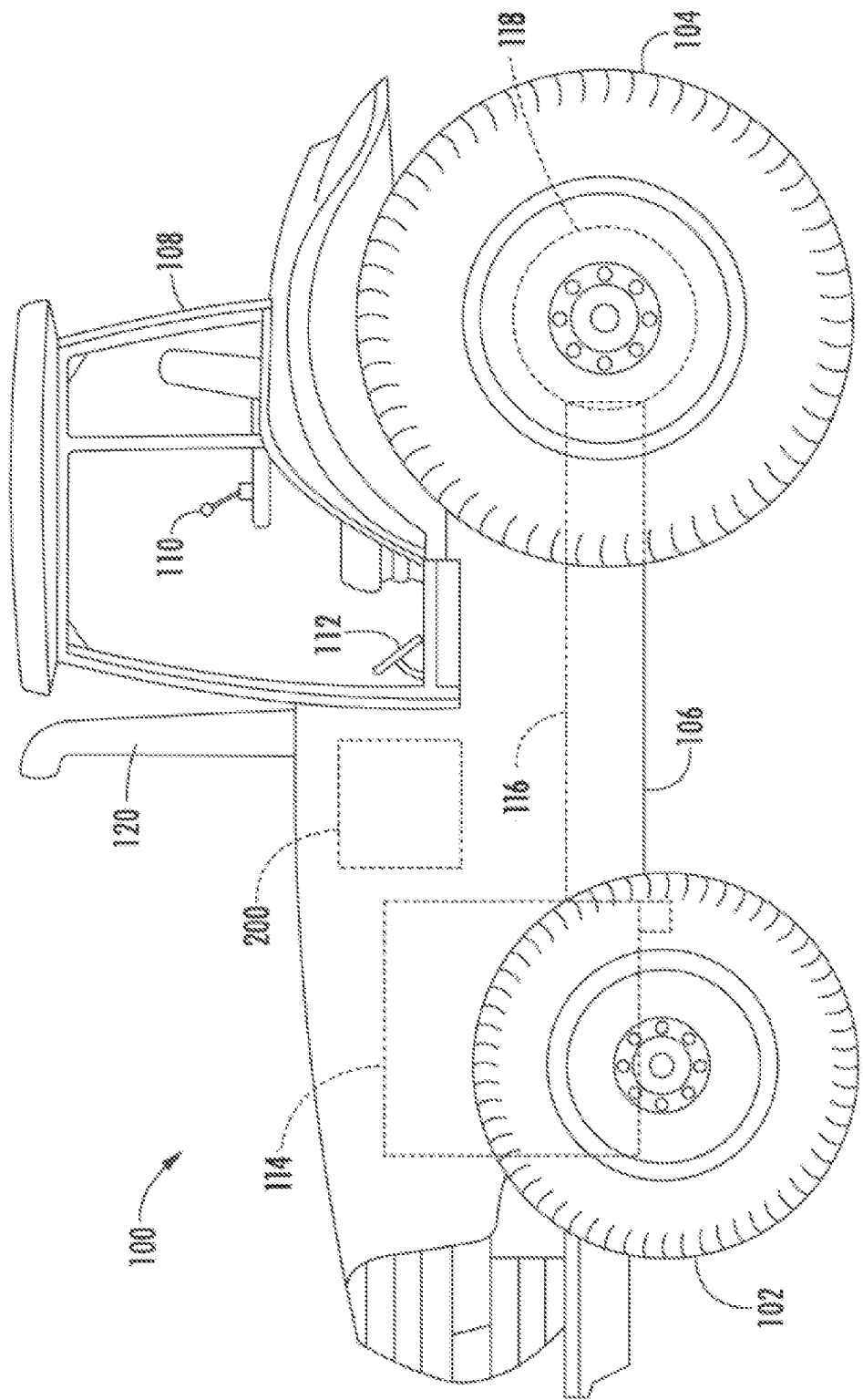
FIG. 1 illustrates a side view of one embodiment of a work vehicle in accordance with aspects of the present subject matter.

Repeat use of reference characters in the present specification and drawings is intended to represent the same or analogous features or elements of the present technology.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to a mixing conduit for use within an exhaust treatment system. The mixing conduit is generally configured to receive engine exhaust and a mixture of engine exhaust and reductant expelled from a DOC system of the exhaust treatment system. The mixing conduit includes an outer tube extending between an upstream end and a downstream end. The mixing conduit further includes an inner tube extending within the outer tube. The inner tube defines an inner flowpath within the inner tube. The inner flowpath is generally configured to receive the mixture of engine exhaust and reductant. The inner and outer tubes also define an outer flowpath extending radially between an exterior surface of the inner tube and an interior surface of the outer tube. The outer flowpath is generally configured to receive the engine exhaust, without the reductant. In one embodiment, the inner and outer tubes together may define concentrically aligned inner and outer flowpaths housed within the outer tube and separated by the inner tube. Generally, the engine exhaust flowing through the outer flowpath may heat the inner tube and reduce or prevent the reductant within the engine exhaust and reductant mixture from condensing on the inner tube. The mixing conduit also includes one or more swirler vanes extending radially within the outer flowpath between the exterior surface of the inner tube and the interior surface of the outer tube. In several embodiments, the swirler vane(s) may define a spiraling or helical pattern as it extends along the outer flowpath between the inner and outer tubes. The swirler vane(s) generally extends an effective length of the outer flowpath to promote heat transfer between the engine exhaust and the inner tube. In one or more embodiments, the helical pattern of the swirler vane(s) may impart a rotating or spiraling flow trajectory to the engine exhaust as it exits the outer flowpath to encourage mixing of the engine exhaust and the mixture of the engine exhaust and reductant downstream of the inner tube.

The disclosed mixing conduit is therefore configured to reduce a temperature differential between the mixture of engine exhaust and reductant flowing through the inner flowpath and the interior surfaces of the inner tube and thus reduce condensation of the reductant within the mixing conduit. By reducing the amount of reductant that condenses on the surfaces of the mixing conduit, the efficiency of the exhaust treatment system may be increased. For example, various embodiments of the disclosed mixing conduit may allow for more of the reductant introduced within the system to be utilized in removing undesirable emission particles within the engine exhaust. Additionally, by reducing the amount of reductant that condenses on the surfaces of the mixing conduit, caking and ammonia slip associated with such condensed reductant may be reduced. Furthermore, by introducing a spiraling flow trajectory to the engine exhaust within the outer flowpath, the reductant may be more uniformly mixed and evaporated within the engine exhaust as a whole. Thus, the desired ratio of pollutants to reactants within the engine exhaust may be more easily achieved without the need to introduce excessive exhaust reductant.

Referring now to the drawings, FIG. 1 illustrates a side view of one embodiment of a work vehicle 100. As shown, the work vehicle 100 is configured as an agricultural tractor. However, in other embodiments, the work vehicle 100 may be configured as any other suitable work vehicle known in the art, such as various other agricultural vehicles, earth-moving vehicles, road vehicles, all-terrain vehicles, off-road vehicles, loaders, and/or the like.

As shown in FIG. 1, the work vehicle 100 includes a pair of front wheels 102, a pair of rear wheels 104, and a chassis 106 coupled to and supported by the wheels 102, 104. An operator's cab 108 may be supported by a portion of the chassis 106 and may house various control devices 110, 112 (e.g., levers, pedals, control panels and/or the like) for permitting an operator to control the operation of the work vehicle 100. Additionally, the work vehicle 100 may include an engine 114 and a transmission 116 mounted on the chassis 106. The transmission 116 may be operably coupled to the engine 114 and may provide variably adjusted gear ratios for transferring engine power to the wheels 104 via a differential 118.

Moreover, the work vehicle 100 may also include an exhaust treatment system 200 for reducing the amount emissions contained within the exhaust from the engine 114. For instance, engine exhaust expelled from the engine 114 may be directed through the exhaust treatment system 200 to allow the levels of nitrous oxide (NOx) emissions contained within the exhaust to be reduced significantly. The cleaned or treated exhaust gases may then be expelled from the exhaust treatment system 200 into the surrounding environment via an exhaust pipe 120 of the work vehicle 100.

It should be appreciated that the configuration of the work vehicle 100 described above and shown in FIG. 1 is provided only to place the present subject matter in an exemplary field of use. Thus, it should be appreciated that the present subject matter may be readily adaptable to any manner of work vehicle configuration. For example, in an alternative embodiment, a separate frame or chassis may be provided to which the engine 114, transmission 116, and differential 118 are coupled, a configuration common in smaller tractors. Still, other configurations may use an articulated chassis to steer the work vehicle 100 or rely on tracks in lieu of the wheels 102, 104. Additionally, although not shown, the work vehicle 100 may also be configured to be operably coupled to any suitable type of work implement, such as a trailer, spray boom, manure tank, feed grinder, plow, and/or the like.

Figure 2:
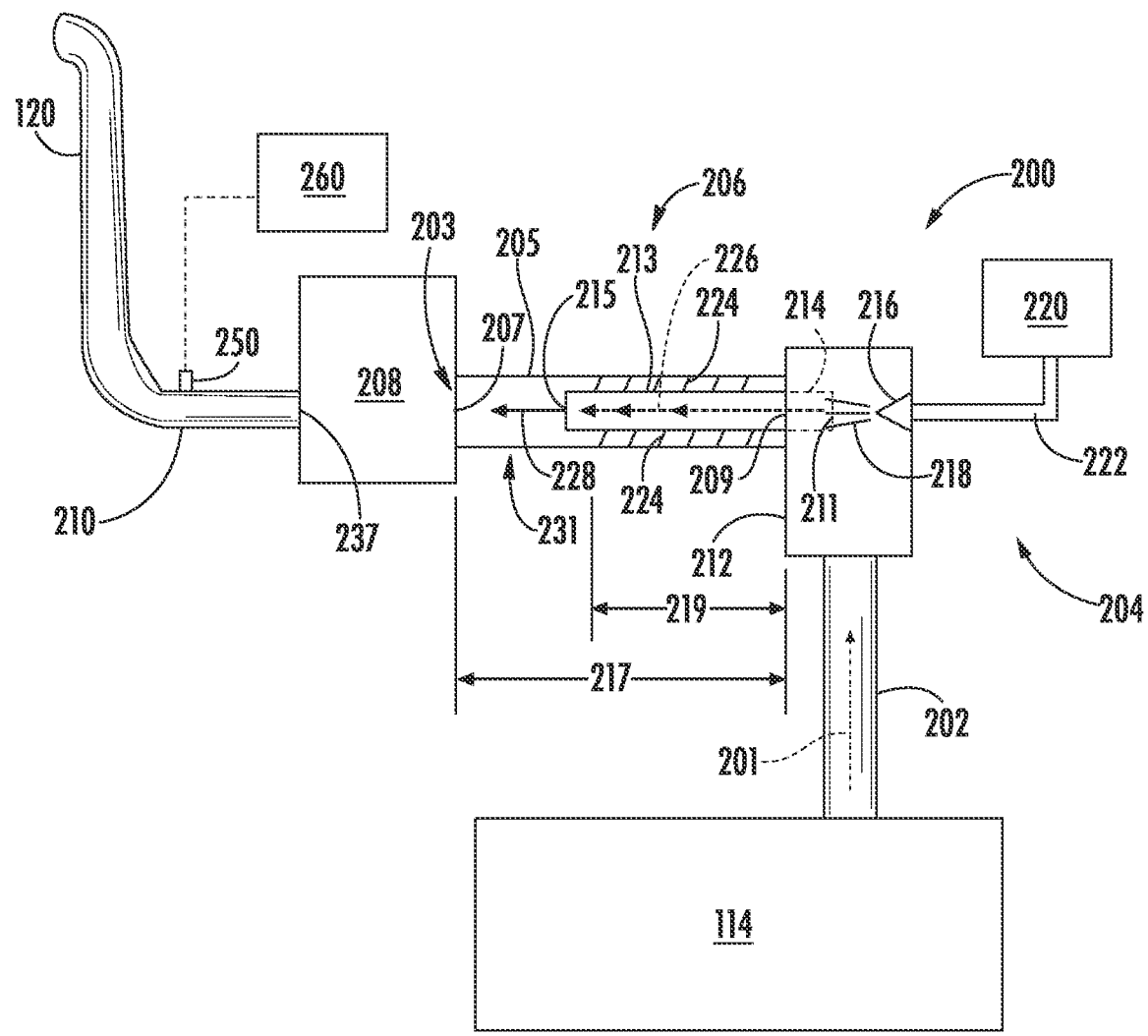
FIG. 2 illustrates a schematic view of one embodiment of an exhaust treatment system suitable for use with a work vehicle in accordance with aspects of the present subject matter.

Referring now to FIG. 2, a schematic view of one embodiment of an exhaust treatment system suitable for use with a work vehicle is illustrated in accordance with aspects of the present subject matter. As represented in FIG. 2, the exhaust treatment system 200 includes an exhaust conduit 202, a diesel oxidation catalyst (DOC) system 204, a mixing conduit 206, a selective catalytic reduction (SCR) system 208, and a treated exhaust flow conduit 210. During operation of the work vehicle 100, exhaust (engine exhaust 201) expelled from the engine 114 is received by the exhaust conduit 202 and flows through the conduit 202 to the DOC system 204. As is generally understood, the DOC system 204 is configured to reduce the levels of carbon monoxide and hydrocarbons present in the engine exhaust 201. For example, as shown in FIG. 2, the DOC system 204 includes a canister or chamber 212 for receiving engine exhaust 201 from the exhaust conduit 202, with the chamber 212 being in flow communication with an upstream end 214 of the mixing conduit 206, described in more detail below. In addition, the DOC system 204 includes a reductant injector nozzle 216 provided in association with the chamber 212 at a location at or adjacent to the upstream end 214 of the mixing conduit 206 to allow an exhaust reductant 218, such as a diesel exhaust fluid (DEF) or any other suitable urea-based fluid, to be injected into a portion of the stream of engine exhaust 201 flowing through the chamber 212 to form an exhaust mixture 226. For instance, as shown in FIG. 2, the reductant injector nozzle 216 may be fluidly coupled to a source of exhaust reductant (e.g., storage tank 220) via a hose or other fluid coupling 222 to allow liquid exhaust reductant to be supplied to the nozzle 216.

The exhaust mixture 226 flowing into the upstream end 214 of the mixing conduit 206 is then directed through the mixing conduit 206 to a downstream end 203 thereof for receipt by the SCR system 208, within which the exhaust mixture 226 is reacted with a catalyst to generate a treated exhaust flow in which the amount of harmful or undesirable gas emissions has been reduced as compared to the engine exhaust 201 initially discharged from the engine 114. The total treated exhaust flow is then expelled from a SCR outlet 237 of the SCR system 208 and is directed through the downstream flow conduit 210 for discharge into the atmosphere (e.g., via an exhaust pipe 120 forming part of or coupled to the downstream flow conduit 210).

Additionally, as shown in FIG. 2, the exhaust treatment system 200 includes an exhaust sensor 250 positioned within the downstream flow conduit 210 to monitor the concentration or amount of emissions remaining within the exhaust flow following treatment within the SCR system 208. In one embodiment, the exhaust sensor 250 comprises one or more nitrous oxide (NOx) sensors configured to detect the amount of NOx contained within the treated exhaust flow. However, in other embodiments, the exhaust sensor 250 may comprise any other suitable sensors or combination of sensors configured to detect the concentration or amount of gaseous emissions contained within the treated exhaust flow, including the detection of gaseous emissions other than NOx and/or the detection of NOx in combination with one or more other gaseous emissions. As shown, in FIG. 2, in one embodiment, the exhaust sensor 250 is communicatively coupled to a controller 260 (e.g., a computing device or another other suitable processor-based device) configured to monitor the exhaust emissions contained within the treated exhaust flow based on the data received from the sensor 250. The controller 260 may then, for example, compare the concentration or amount of detected exhaust emissions to a predetermined limit or threshold and control one or more components of the work vehicle 100 based on such comparison, such as by adjusting the combustion temperature of the engine 114 and/or varying the amount of reductant injected into the DOC system 204 to ensure that the exhaust emissions remain below a predetermined limit or threshold.

With conventional mixing conduits, as the exhaust mixture 226 flows into and through the mixing conduit, a portion of the reductant 218 may generally condense onto the walls of the mixing conduit. For instance, the walls of a typical mixing conduit may generally be at a lower temperature than the exhaust mixture 226 due to the elevated temperature of the engine exhaust 201 leaving the engine 114. As such, the reductant 218 may condense onto the walls of the mixing conduit and form liquid streams of the reductant 218 along the interior walls of the mixing conduit. The formation of such liquid streams of the reductant and/or condensation of the reductant generally reduces the amount of reductant 218 within the exhaust mixture 226 and thus reduces the amount of emission particles that may be subsequently removed within the SCR system 208. Thus, condensation of the reductant 218 may generally be associated with reduced efficiency of the exhaust treatments system 200 and require additional reductant 218 to be introduced into the engine exhaust 201 to meet desirable emission standards for the work vehicle 100. Further, the condensed reductant 218 often dries onto the interior surface of the conduit and cause caking within the exhaust treatment system 200 and is generally further associated with increased ammonia slip within the system.

As such, several embodiments of the disclosed mixing conduit 206 may allow for interior walls near the upstream end 214 of the mixing conduit 206 exposed to the exhaust mixture 226 to be heated. Generally, by heating the upstream surfaces of the mixing conduit 206 exposed to the exhaust mixture 226, condensation of the reductant 218 on such surfaces may be reduced or eliminated. Thus, more of the reductant 218 introduced into the engine exhaust 201 may be available for reaction with the catalyst within the SCR system 208, which may increase the efficiency of the exhaust treatment system 200. Further, caking of the reductant 218 and/or ammonia slip may also be reduced or eliminated by reducing the amount of the reductant 218 that condenses on the walls of the mixing conduit 206.

For example, as shown in FIG. 2, the mixing conduit 206 may include an inner tube 213 extending from the DOC system 204 at least partially toward the SCR system 208 and defining an inner flowpath 225 (see FIGS. 3 and 4) for flow of the exhaust mixture 226 and an outer tube 205 extending between the DOC system 204 and the SCR system 208 and defining an outer flowpath 227 (see FIGS. 3 and 4) for flow of the engine exhaust 201. Generally, the engine exhaust 201 flowing through the outer flowpath 227 may heat the inner tube 213 in order to reduce the temperature differential between the inner tube 213 and the exhaust mixture 226, thereby reducing the amount of reductant 218 condensing on interior surfaces of the inner tube 213. Further, as shown, one or more swirler vanes 224 may be positioned between the inner tube 213 and the outer tube 205 in order to provide a longer flowpath for the engine exhaust 201 flowing through the outer flowpath 227. By providing a longer flowpath for the engine exhaust 201, the amount of heat transferred from the engine exhaust 201 to the inner tube 213 may be increased, and thus further increase the temperature of the inner tube 213. Particularly, by further increasing the temperature of the inner tube 213, the amount of reductant 218 condensing on the interior surfaces of the inner tube 213 may be reduced significantly. Furthermore, it should be appreciated that the swirler vane(s) 224 may support the inner tube 213 relative to the outer tube 205.

As illustrated in FIG. 2, the outer tube 205 may extend lengthwise from a first upstream end 209 of the outer tube 205 to a first downstream end 207 of the outer tube 205. The outer tube 205 may be coupled to the DOC system 204 at the first upstream end 209 such that the outer tube 205 of the mixing conduit 206 is in flow communication with the DOC system 204 to receive the engine exhaust 201 from the DOC system 204. For instance, the first upstream end 209 of the outer tube 205 may be coupled to the chamber 212 of the DOC system 204 using any suitable means, such as welding, adhesives, fasteners, or the like. Generally, in the depicted embodiment, the downstream end 203 of the mixing conduit 206 may correspond to the first downstream end 207 of the outer tube 205. Further, the first downstream end 207 may be coupled to the SCR system 208 such that the outer tube 205 and the mixing conduit 206 are in flow communication with the SCR system 208. The first downstream end 207 of the outer tube 205 may be coupled to the SCR system 208, such as to an external canister or chamber, using any suitable means, such as welding, adhesives, fasteners, or the like. Further, as shown, the outer tube 205 may define an outer length 217 between the first upstream end 209 and the first downstream end 207.

Further, the inner tube 213 may extend lengthwise within the outer tube 205 from a second upstream end 211 to a second downstream end 215 of the inner tube 213. In several embodiments, the second upstream end 211 of the inner tube 213 may be positioned upstream of the first upstream end 209 of the outer tube 205. For example, as illustrated, the second upstream end 211 of the inner tube 213 may extend into the chamber 212 of the DOC system 204. As such, the upstream end 214 of the mixing conduit 206 may generally correspond to the portion of the inner tube 213 within the chamber 212 of the DOC system 204. Moreover, as illustrated in FIG. 2, the reductant injector 216 may generally be configured to spray the reductant 218 within the second upstream end 211 of the inner tube 213 such that the inner tube 213 is in flow communication with the DOC system 204 to receive the exhaust mixture 226 from the DOC system 204. More specifically, in several embodiments, the reductant injector 216 may be positioned to spray the reductant 218 within the inner tube 213 such that the exhaust mixture 226 flows entirely or mostly through the second upstream end 211 of the inner tube 213 and thereby reduce or eliminate exhaust mixture 226 flowing through the first upstream end 209 of the outer tube 205. In an additional or alternative embodiment, not shown, the second upstream end 211 of the inner tube 213 may define a larger diameter relative to the rest of the inner tube 213 in order to reduce reductant 218 being sprayed outside of the inner tube 213.

The inner tube 213 may generally extend within the outer tube 205 such that the second downstream end 215 is positioned within the outer tube 205 a length (illustrated as inner length 219 between the second downstream end 215 of the inner tube 213 and the first upstream end 209 of the outer tube 205) from the first upstream end 209 of the outer tube 205 ranging from 25% to 75% of the outer length 217 of the outer tube 205. However, in an alternative embodiment, the second downstream end 209 may be positioned at or approximately at the first downstream end 207 of the outer tube 205 such that the inner and outer lengths 219, 217 are the same or approximately the same. Furthermore, the mixing conduit 206 may define a mixing zone 231 downstream of the second downstream end 215 of the inner tube 213 such that the mixing conduit 206 is configured to combine the engine exhaust 201 flowing through the outer flowpath between the outer and inner tubes 205, 213 with the exhaust mixture 221 flowing through the inner flowpath within the inner tube 213 into a combined exhaust mixture 228. For example, the mixing zone 231 may generally correspond to a void or cavity within the outer tube 205 between the second downstream end 215 of the inner tube 213 and the first downstream end 207 of the outer tube 205 for combining the engine exhaust 201 with the exhaust mixture 226 to form the combined exhaust mixture 228. As such, the first downstream end 207 of the outer tube 205 may be in flow communication with the SCR system 208 such that the SCR system 208 receives the combined exhaust mixture 228 from the mixing conduit 206.

Figure 3:
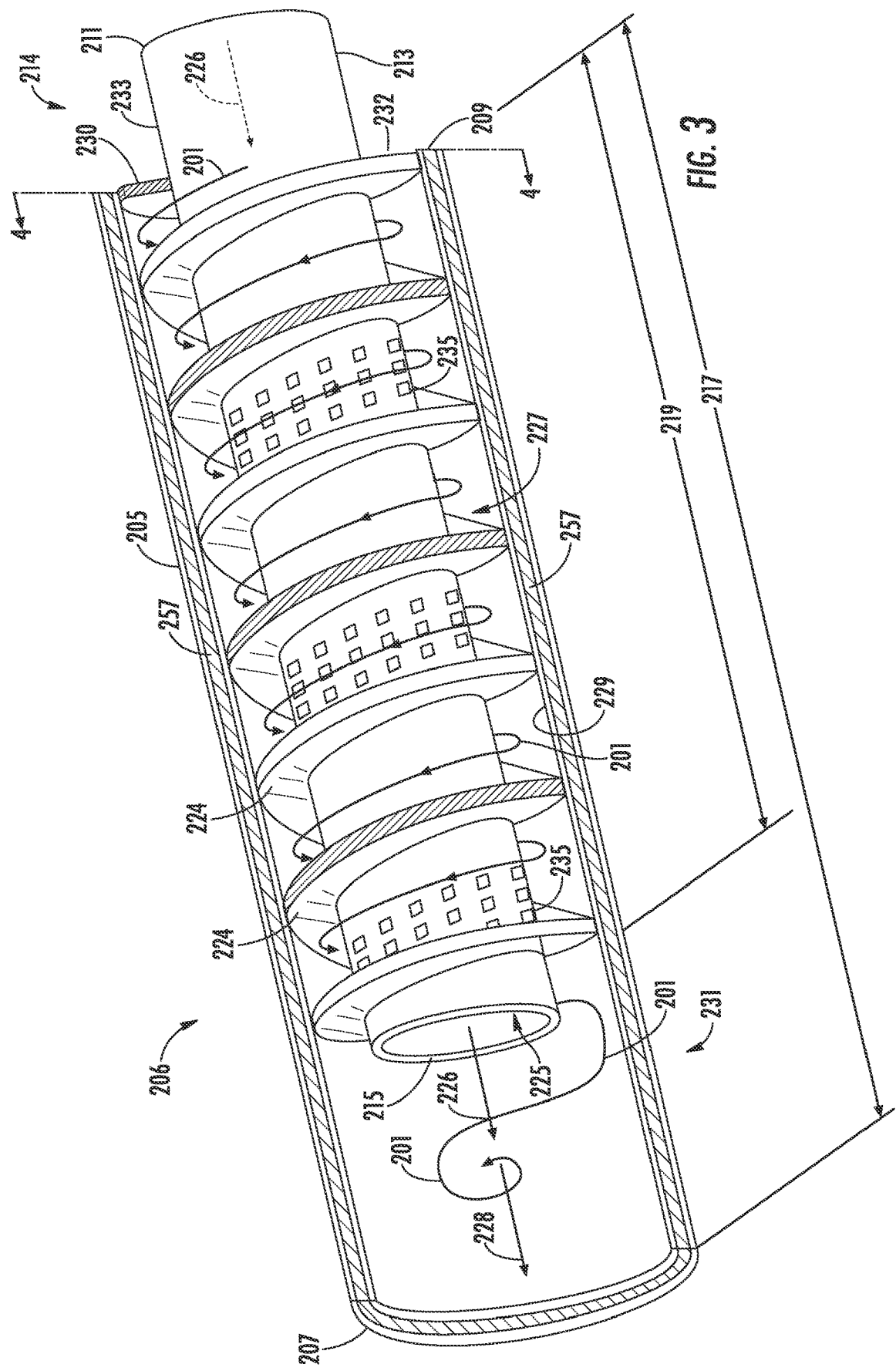
FIG. 3 illustrates a perspective view of one embodiment of a mixing conduit suitable for use within the disclosed exhaust treatment system in accordance with aspects of the present subject matter, particularly illustrating an outer tube cut away and cross-sectioned to illustrate an inner tube and swirler vanes of the mixing conduit.
Figure 4:
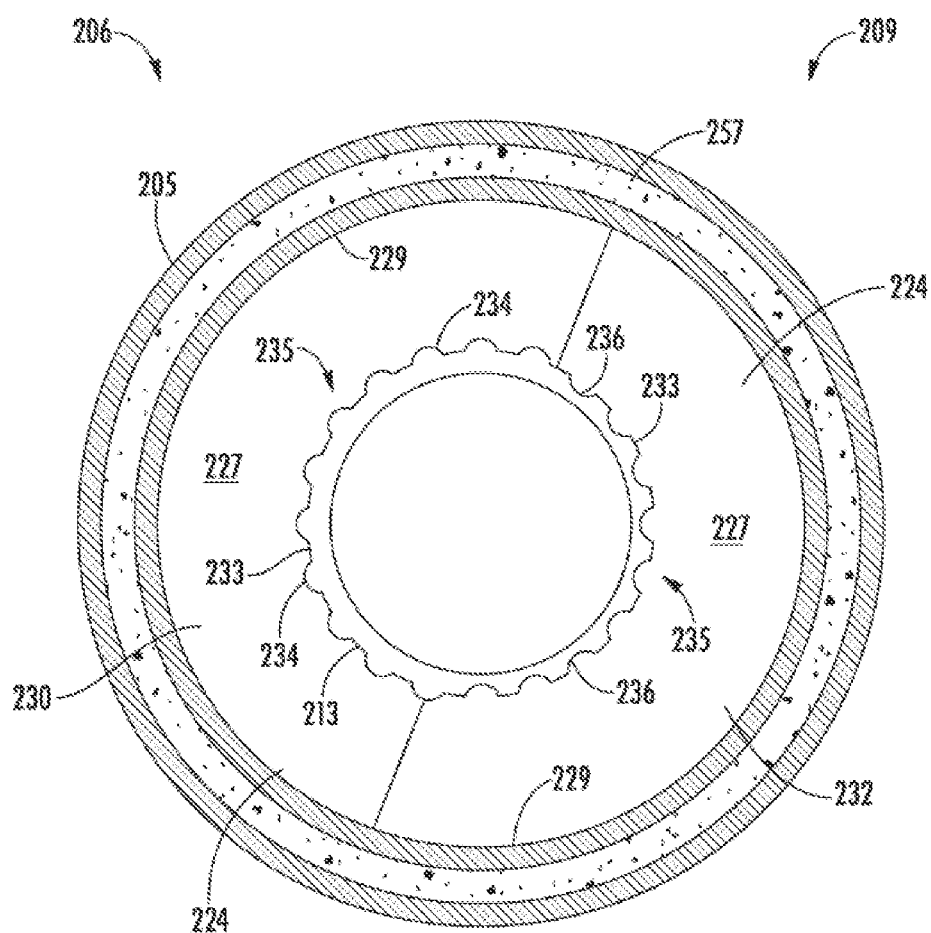
FIG. 4 illustrates a cross-sectional view of another embodiment of a mixing conduit taken from the perspective of section line 4-4 shown in FIG. 3, particularly illustrating different embodiments of turbulence generators suitable for use with various embodiments of the disclosed mixing conduit.

Referring now to FIGS. 3 and 4, different views of embodiments of mixing conduits as described above with reference to FIG. 2 are illustrated in accordance with aspects of the present subject matter. Particularly, FIG. 3 illustrates a perspective view of one embodiment of a mixing conduit 206 with an outer tube 205 shown as a cross-section in order to illustrate an inner tube 213 and swirler vanes 224. FIG. 4 illustrates a cross-section of another embodiment of the mixing conduit 206 taken from the perspective of view section line 4-4 shown in FIG. 3, particularly illustrating different embodiments of turbulence generators 235 suitable for use within various embodiments of the mixing conduit 206 disclosed herein. In general, the mixing conduit 206 will be described herein with reference to the exhaust treatment system 200 and work vehicle 10 described above with reference to FIGS. 1 and 2. However, it should be appreciated by those of ordinary skill in the art that aspects of the disclosed mixing conduits may generally be utilized with work vehicles and/or exhaust treatments systems having any other suitable work vehicle configuration and/or exhaust treatment system configuration, respectively. The mixing conduits 206 of FIGS. 3 and 4 may generally be configured the same as or similar to the mixing conduit of FIG. 2. For instance, as particularly shown in FIG. 3, the mixing conduit 206 may include the outer tube 205, the inner tube 213 extending at least partially along the length of the outer tube 205, and swirler vane(s) 224 positioned between the outer and inner tubes 205, 213.

As illustrated in the depicted embodiments, the outer tube 205 may include a first upstream end 209 and extend lengthwise towards a first downstream end 207. The outer tube 205 may include an interior surface 229 extending between the ends 209, 207 that defines the radially outer flow boundary for exhaust flowing within the outer tube 205. Further, as shown particularly in FIG. 3, the inner tube 213 may include a second upstream end 211 and extend lengthwise within the outer tube 205 towards a second downstream end 215 of the inner tube 213. An exterior surface 233 of the inner tube 213 may additionally extend from the second upstream end 211 of the inner tube 213 to the second downstream end 215 of the inner tube 213 that defines the radially inner flow boundary for exhaust flowing through the outer tube 205.

Further, the inner tube 213 may define an inner flowpath 225 extending between the ends 211, 215 of the inner tube 213. The inner flowpath 225 may be configured to receive an exhaust mixture 226 at the second upstream end 215 for flow towards the second downstream end 215, as is generally described above with reference to FIG. 2. Furthermore, the inner and outer tubes 213, 205 may define an outer flowpath 227 extending therebetween. More particularly, the outer flowpath 227 may be defined radially between the exterior surface 233 of the inner tube 213 and the interior surface 229 of the outer tube 205 relative to a centerline of the mixing conduit 206 and further extend between the first upstream end 209 of the outer tube 205 and the second downstream end 215 of the inner tube 213. The outer tube 205 may receive engine exhaust 201 at the first upstream end 209 for flow towards the first downstream end 207 of the outer tube 205 within the outer flowpath 227. Additionally, as described above with reference to FIG. 2, a mixing zone 231 may be defined downstream of the second downstream end 215 of the inner tube 213 and upstream of the first downstream end 215 of the outer tube 205 in order to combine the engine exhaust 201 flowing through the outer flowpath 227 and the exhaust mixture 226 flowing through the inner flowpath 225 into a total exhaust mixture 228. However, in alternative embodiments, the second downstream end 215 of the inner tube 213 may be positioned at or approximately at the first downstream end 207 of the outer tube 205 such that the mixing conduit 206 does not include the mixing zone 231.

As shown particularly in the illustrated embodiment of FIG. 3, the mixing conduit 206 may include one or more swirler vanes 224 extending radially within outer flowpath 227 between the exterior surface 233 of the inner tube 213 and the interior surface 229 of the outer tube 205. As shown, the swirler vane(s) 224 may extend fully along an inner length 219 defined between the second downstream end 215 of the inner tube 213 and the first upstream end 209 of the outer tube 205. However, in alternative embodiments, the swirler vane(s) 224 may extend from the first upstream end 209 of the outer tube 205 along only a portion of the inner length 219 toward the second downstream end 215 of the inner tube 213. Further, as shown, the mixing conduit 206 may include two swirler vanes, e.g., a first swirler vane 230 and a second swirler vane 232, the first swirler vane 230 partially shaded in FIG. 3 to distinguish it from the second swirler vane 232. In the illustrated embodiment, both swirler vanes 230, 232 may extend along the full inner length 219 between the second downstream end 215 of the inner tube 213 and the first upstream end 209 of the outer tube 205. However, in alternative embodiments, the swirler vanes 230, 232 may extend along different portions of the inner length 219 and have different starting and/or stopping positions along the inner length 219. Generally, each swirler vane 230, 232 may spiral circumferentially as the vane extends axially along at least a portion of the inner length 219. As a result, the swirler vane(s) 224 may define a spiraling or helical pattern within the outer flowpath 227.

Further, though the illustrated embodiments include two swirler vanes 230, 232, it should be appreciated that alternative embodiments may include more or less swirler vanes 224, and the subject matter described herein may be equally applicable to such alternative configurations. In several embodiments, the swirler vane(s) 224 may be coupled to one or both of the exterior surface 233 of the inner tube 213 and the interior surface 229 of the outer tube 205. For example, radially inner and/or radially outer surfaces of the swirler vane(s) 224 may be coupled to the exterior surface 233 of the inner tube 213 and/or the interior surface 229 of the outer tube 205, respectively, using any suitable means, such as welding, adhesives, fasteners, friction fit, or the like. As such, the inner tube 213 may be supported within the outer tube 205 via the swirler vane(s) 224. Additionally, though the swirler vane(s) 224 are illustrated as monolithic pieces extending within the outer flowpath 227, in one or more embodiments, each swirler vane 224 may include two or more segments positioned end to end or coupled end to end to form a respective swirler vane 224.

The swirler vane(s) 224 may generally extend along the length the engine exhaust 201 must flow through the outer flowpath 227. For example, the swirler vane(s) 224 may force the engine exhaust 201 flowing through the outer flowpath 227 to define a generally helical profile and thus provide an effectively longer flowpath for the engine exhaust 201. As such, heat transfer between the engine exhaust 201 and the inner tube 213 may be increased. Particularly, the temperature of the inner tube 213 may be increased to a greater degree as compared to a mixing conduit that does not include the swirler vane(s) 224. Thus, condensation of the reductant 218 within the exhaust mixture 226 flowing through the inner flowpath 225 onto the inner tube 213 may be further reduced.

The swirler vane(s) 224 may additionally be configured to impart a rotating or spiraling flow trajectory to the flow of the engine exhaust 201 expelled from the outer flowpath 227 proximate to the second downstream end 215 of the inner tube 213 due to the spiraling or helical pattern of the swirler vane(s) 224. Such spiraling flow of the engine exhaust 201 may facilitate enhanced mixing of the engine exhaust 201 and the exhaust mixture 226 within the mixing zone 231 downstream of the second downstream end 215 of the inner tube 213.

Referring still to the exemplary embodiments of FIGS. 3 and 4, the outer tube 205 may optionally include an insulation material 257. The insulation material 257 may generally prohibit heat transfer between the flow of engine exhaust 201 through the outer flowpath 227 and the outer tube 205 and/or through the outer tube 205. By reducing the heat transfer to the outer tube 205, heat transfer may be increased between the engine exhaust 201 and the inner tube 213 as the engine exhaust 201 flows through the outer flowpath 227. For example, as shown, the insulation material 257 may be included within the outer tube 205. In additional or alternative embodiments, one or more insulation materials 257 may be coupled to the interior surface 229 of the outer tube 205 and/or an outer surface of the outer tube 205.

As shown in the illustrated embodiments, one or more turbulence generators 235 may be provided within or in operative association with the outer flowpath 227, such as formed within or coupled to the exterior surface 233 of the inner tube 213. Such turbulence generators 325 may serve one or more purposes. One purpose may be to generate turbulence within the engine exhaust 201 flowing through the outer flowpath 227. By introducing turbulence within the flow of the engine exhaust 201, additional heat may be transferred between the engine 201 exhaust flowing through the outer flowpath 227 and the inner tube 213. Secondly, such turbulence generators 325 may increase the surface area of the exterior surface 233 of the inner tube 213. By increasing the surface area of the exterior surface 233, heat transferred to the inner tube 213 from the engine exhaust 201 may also be increased. The turbulence generators 235 may be positioned along only a portion of the exterior surface 233 of the inner tube 213. For example, as illustrated in FIG. 3, the turbulence generators 235 are positioned on a portion of the exterior surface 233 downstream of the first swirler vane 230 and upstream of the second swirler vane 232. However, in an alternative embodiment, the entire exterior surface 233 of the inner tube 213 may include turbulence generators 235. In still further embodiments, the turbulence generators 235 may only be positioned on the exterior surface 233 of the inner tube 213 along the inner length 219, e.g., downstream of the first upstream end 209 of the outer tube 205. Additionally, or alternatively, the turbulence generators 235 may be included on the exterior surface 233 of the inner tube 213 along the full inner length 219 to the second downstream end 215 of the inner tube 213, may only be included along a portion the exterior surface 233 of the inner tube 213 from the first upstream end 209 of the outer tube 205, and/or may define breaks where there are no turbulence generators 235. Further, one or more embodiments of the mixing conduit 206 may not include turbulence generators 235.

Referring particularly to the exemplary embodiment of FIG. 4, one or more of the turbulence generators 235 may be configured as protrusion(s) 234 extending radially outward from the exterior surface 233 of the inner tube 213, such as one or more ridges, ribs, or the like. As also depicted in FIG. 4, one or more of the turbulence generators 235 may be configured as indention(s) 236 extending radially inward into the exterior surface 233 of the inner tube 213, such as one or more dimples, recesses, or the like. However, it should be appreciated that the turbulence generators 235 may correspond to any suitable elements that are configured to introduce turbulence within the flow of the engine exhaust 201 through the outer flowpath 227 and/or increase the surface area of the exterior surface 233 of the inner tube 213. Further, it is contemplated that the exterior surface 233 of the inner tube 213 may only include one type of turbulence generator 235 or multiple type of turbulence generators 235. For example, different portions of the exterior surface 233 of the inner tube 213 may include different types of turbulence generators 235. In an additional or alternative embodiment, two or more different types of turbulence generators 235 may be arranged in a pattern, such as in grid or lattice, on a portion of or all of the exterior surface 233 of the inner tube 213.

This written description uses examples to disclose the technology, including the best mode, and also to enable any person skilled in the art to practice the technology, including making and using any devices or systems and performing any incorporated methods. The patentable scope of the technology is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

What is claimed is:

1. A mixing conduit for use within an exhaust treatment system of a work vehicle, the mixing conduit configured to receive engine exhaust and a mixture of engine exhaust and reductant from a diesel oxidation catalyst (DOC) of the exhaust treatment system, the mixing conduit comprising:

an outer tube extending lengthwise from a first upstream end of the outer tube to a first downstream end of the outer tube, the outer tube including an interior surface, wherein the outer tube defines a length between the first upstream end of the outer tube and the first downstream end of the outer tube, and wherein the second downstream end of the inner tube is positioned within the outer tube a length from the first upstream end of the outer tube ranging from 25% to 75% of a total length of the outer tube defined between the first upstream and the first downstream ends of the outer tube;

an inner tube extending lengthwise within the outer tube from a second upstream end of the inner tube to a second downstream end of the inner tube, the inner tube including an exterior surface, wherein the inner tube defines an inner flowpath within the inner tube, and wherein the outer tube and inner tube define an outer flowpath radially between the exterior surface of the inner tube and the interior surface of the outer tube, and wherein the outer flowpath is longer than the inner flowpath between the first upstream end of the outer tube and the second downstream end of the inner tube, wherein the inner tube is configured to receive the mixture of engine exhaust and reductant for flow within the inner flowpath, and the outer tube is configured to receive the engine exhaust for flow within the outer flowpath; and at least one swirler vane extending radially between the exterior surface of the inner tube and the interior surface of the outer tube and within the outer flowpath.

2. The mixing conduit of claim 1, wherein the mixing conduit is configured to combine the engine exhaust flowing through the outer flowpath with the mixture of engine exhaust and reductant flowing through the inner flowpath downstream of the second downstream end of the inner tube.

3. The mixing conduit of claim 1, wherein the inner tube includes a plurality of turbulence generators on the exterior surface of the inner tube.

4. The mixing conduit of claim 3, wherein the plurality of turbulence generators includes at least one protrusion or indentation.

5. The mixing conduit of claim 1, wherein the at least one swirler vane extends within the outer flowpath from the first upstream end of the outer tube to the second downstream end of the inner tube.

6. The mixing conduit of claim 1, wherein the second upstream end of the inner tube is positioned upstream of the first upstream end of the outer tube.

7. The mixing conduit of claim 1, wherein the outer tube comprises an insulation material.

8. An exhaust treatment system for a work vehicle, the system comprising:

an exhaust conduit configured for transmitting engine exhaust from an engine;

a DOC system in flow communication with the exhaust conduit for receiving the engine exhaust, the DOC system including a reductant injector configured to introduce a reductant into a portion of the engine exhaust to form a mixture of engine exhaust and reductant; and a mixing conduit in flow communication with the DOC system for receiving the engine exhaust and the mixture of engine exhaust and reductant from the DOC system, the mixing conduit comprising:
- an outer tube extending lengthwise from a first upstream end of the outer tube to a first downstream end of the outer tube, the outer tube including an interior surface, wherein the outer tube defines a length between the first upstream end of the outer tube and the first downstream end of the outer tube, and wherein the second downstream end of the inner tube is positioned within the outer tube a length from the first upstream end of the outer tube ranging from 25% to 75% of a total length of the outer tube defined between the first upstream end and the first downstream end of the outer tube;
- an inner tube extending lengthwise within the outer tube from a second upstream end of the inner tube to a second downstream end of the inner tube, the inner tube including an exterior surface, wherein the inner tube defines an inner flowpath within the inner tube, and wherein the outer tube and inner tube define an outer flowpath radially between the exterior surface of the inner tube and the interior surface of the outer tube, the inner flowpath fluidly separated from the outer flowpath between the first upstream end and the second downstream end, wherein the inner tube is configured to receive the mixture of engine exhaust and reductant for flow within the inner flowpath, and the outer tube is configured to receive the engine exhaust for flow within the outer flowpath; and
- at least one swirler vane extending radially between the exterior surface of the inner tube and the interior surface of the outer tube and within the outer flowpath, wherein the reductant injector is configured to spray the reductant into the engine exhaust within the second upstream end of the inner tube such that the inner tube receives the mixture of engine exhaust and reductant.

9. The exhaust treatment system of claim 8, wherein mixing conduit is configured to combine the engine exhaust flowing through the outer flowpath with the mixture of engine exhaust and reductant flowing through the inner flowpath downstream of the second downstream end of the inner tube.

10. The exhaust treatment system of claim 8, the at least one swirler vane is configured to impart a spiraling flow trajectory to the engine exhaust flowing within the outer flowpath.

11. The exhaust treatment system of claim 8, wherein the inner tube includes a plurality of turbulence generators on the exterior surface of the inner tube.

12. The exhaust treatment system of claim 11, wherein the plurality of turbulence generators includes at least one protrusion or indentation.

13. The exhaust treatment system of claim 8, wherein the at least one swirler vane extends within the inner tube from the first upstream end of the outer tube to the second downstream end of the inner tube.

14. An exhaust treatment system for a work vehicle, the system comprising:
- an exhaust conduit configured for transmitting engine exhaust from an engine;
- a DOC system in flow communication with the exhaust conduit for receiving the engine exhaust, the DOC system including a DOC canister and a reductant injector configured to introduce a reductant into a portion of the engine exhaust to form a mixture of engine exhaust and reductant; and
- a mixing conduit in flow communication with the DOC system for receiving the engine exhaust and the mixture of engine exhaust and reductant from the DOC system, the mixing conduit comprising:
  - an outer tube extending lengthwise from a first upstream end of the outer tube to a first downstream end of the outer tube, the outer tube including an interior surface, the first upstream end of the outer tube coupled to the DOC canister;
  - an inner tube extending lengthwise within the outer tube from a second upstream end of the inner tube extending into the DOC canister to a second downstream end of the inner tube, the inner tube including an exterior surface, wherein the inner tube defines an inner flowpath within the inner tube, and wherein the outer tube and inner tube define an outer flowpath radially between the exterior surface of the inner tube and the interior surface of the outer tube; and
  - at least one swirler vane extending radially between the exterior surface of the inner tube and the interior surface of the outer tube and within the outer flowpath.

15. The mixing conduit of claim 1, wherein the at least one swirler vane is configured to impart a spiraling flow trajectory to the engine exhaust flowing within the outer flowpath.

* * * * *